(12) United States Patent
Yang et al.

(10) Patent No.: US 10,438,530 B2
(45) Date of Patent: Oct. 8, 2019

(54) COMPUTER SYSTEM AND DISPLAY INTERFACE CIRCUIT AND DISPLAY INTERFACE METHOD THEREOF

(71) Applicant: Wistron Corporation, New Taipei (TW)

(72) Inventors: Ke Yang, New Taipei (TW); Wei Liang Liao, New Taipei (TW)

(73) Assignee: Wistron Corporation, New Taipei (TW)

(*) Notice: Subject to any disclaimer, the term of this patent is extended or adjusted under 35 U.S.C. 154(b) by 56 days.

(21) Appl. No.: 15/857,656

(22) Filed: Dec. 29, 2017

(65) Prior Publication Data

US 2019/0164469 A1    May 30, 2019

(30) Foreign Application Priority Data

Nov. 30, 2017 (CN) .......................... 2017 1 1240688

(51) Int. Cl.
*G09G 3/20* (2006.01)
*G09G 3/36* (2006.01)

(52) U.S. Cl.
CPC ............ *G09G 3/2096* (2013.01); *G09G 3/36* (2013.01); *G09G 2310/0289* (2013.01); *G09G 2330/021* (2013.01); *G09G 2330/04* (2013.01); *G09G 2370/12* (2013.01)

(58) Field of Classification Search
USPC ................... 713/300–340; 340/12.32, 825
See application file for complete search history.

(56) References Cited

U.S. PATENT DOCUMENTS

| | | | | |
|---|---|---|---|---|
| 4,860,185 A | * | 8/1989 | Brewer | G06F 1/28 363/41 |
| 5,710,911 A | * | 1/1998 | Walsh | G06F 1/10 713/322 |
| 5,764,547 A | * | 6/1998 | Bilich | G06F 1/32 713/321 |
| 5,867,106 A | * | 2/1999 | Bi | G06F 1/1613 340/5.54 |

* cited by examiner

*Primary Examiner* — Chad M Dicke
(74) *Attorney, Agent, or Firm* — Donald E. Stout; Stout, Uxa & Buyan, LLP

(57) ABSTRACT

A display interface circuit includes a first transistor and a second transistor electrically connecting in series between a first motherboard power and a display power. A first body diode of the first transistor has a current direction opposite a second body diode of the second transistor. When a display device powers up but a motherboard powers downs, a first control circuit turns on the first transistor and a second control circuit turns off the second transistor such that a current does not leak from the display power toward the first motherboard power due to the second body diode. When the display device powers down but the motherboard powers up, the first control circuit turns off the first transistor and the second control circuit turns off the second transistor such that the first motherboard power is not outputted to a video display interface due to the first body diode.

20 Claims, 3 Drawing Sheets

COMPUTER SYSTEM AND DISPLAY INTERFACE CIRCUIT AND DISPLAY INTERFACE METHOD THEREOF

CROSS-REFERENCE TO RELATED APPLICATIONS

This application claims priority of China Patent Application No. 201711240688.0, filed on Nov. 30, 2017, the entire contents of which are hereby incorporated by reference.

BACKGROUND OF THE INVENTION

1. Field of the Invention

The present invention generally relates to a computer system, and more particularly to a display interface circuit and method capable of preventing electrical leakage and/or saving power.

2. Description of Related Art

Digital visual interface (DVI) is a video display interface commonly used to connect a video source of a computer to a display device such as a liquid crystal display.

The computer and the display device generally do not power up at the same time. If the display device powers up but the computer still powers down, the power of the display device will likely leak to the motherboard of the computer, making the computer unable to boot up or resulting in abnormal timing. For overcoming the leakage problem, a diode is commonly used to block the electrical leakage. However, the diode generally possesses a forward voltage Vf of 0.2-0.4 volt, which causes a large voltage drop in the power provided to the display device, probably making the display device abnormal.

If the computer powers up but the display device still powers down, the motherboard of the computer will provide power to the display device via DVI, thus wasting power. Further, if a short circuit happens at the display device, the motherboard of the computer can be protected by a fuse. Nevertheless, a large current may probably flow through and damage the diode during the response time of the fuse. The damaged diode certainly cannot normally function afterwards.

A need has thus arisen to propose a novel scheme to solve the problems related to interconnection between the computer and the display device.

SUMMARY OF THE INVENTION

In view of the foregoing, it is an object of the embodiment of the present invention to provide a display interface circuit and method capable of preventing electrical leakage from a display device to a motherboard, saving power of the motherboard, and protecting the motherboard.

According to one embodiment, a display interface circuit includes a first transistor, a second transistor, a first control circuit and a second control circuit. The first transistor has a first body diode, and the second transistor has a second body diode. The first transistor and the second transistor are electrically connected in series between a first motherboard power and a display power, and the first body diode has a current direction opposite the second body diode. The first control circuit controls the first transistor, and the second control circuit controls the second transistor. When a display device powers up but a motherboard powers down, the first control circuit turns on the first transistor and the second control circuit turns off the second transistor such that a current does not leak from the display power toward the first motherboard power due to the second body diode. When the display device powers down but the motherboard powers up, the first control circuit turns off the first transistor and the second control circuit turns off the second transistor such that the first motherboard power is not outputted to a video display interface due to the first body diode, thus saving power.

DETAILED DESCRIPTION OF THE INVENTION

Figure 1:
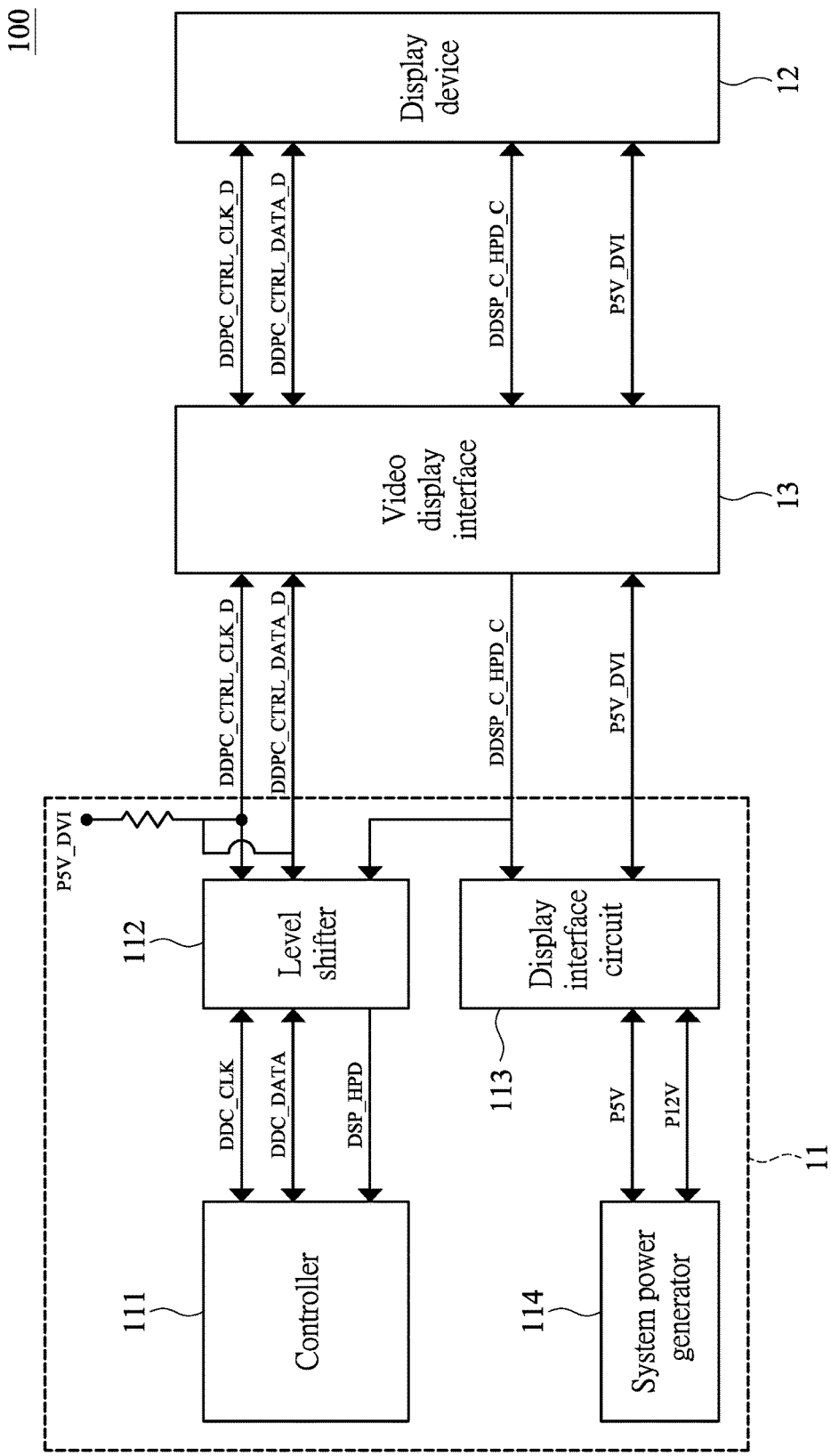
FIG. 1 shows a block diagram illustrating a computer system according to one embodiment of the present invention.

FIG. 1 shows a block diagram illustrating a computer system 100 according to one embodiment of the present invention. Only blocks and signals pertinent to the embodiment are demonstrated in the figure. In the embodiment, the computer system 100 may primarily include a motherboard 11, a display device 12 and a video display interface 13. Specifically, the motherboard 11 may provide video signals to the display device 12 (e.g., a liquid crystal display) via the video display interface 13. The video display interface 13 of the embodiment is exemplified by, but not limited to, digital visual interface (DVI). Other video display interfaces such as video graphics array (VGA) or high-definition multimedia interface (HDMI) may be used instead.

As shown in FIG. 1, the motherboard 11 may include a controller 111 such as platform controller hub (PCH). The motherboard 11 may include a level shifter 112 that is disposed between the controller 111 and the video display interface 13, and is configured to translate signals from a voltage level to another, allowing compatibility between the controller 111 and the video display interface 13. For example, the level shifter 112 translates a clock signal DDC_CLK into another clock signal DDPC_CTRL_CLK_D, and translates a data signal DDC_DATA into another data signal DDPC_CTRL_DATA_D. Moreover, the level shifter 112 translates a hot plug (HP) signal DDSP_C_HPD_C into another hot plug signal DSP_HPD.

According to one aspect of the embodiment, the motherboard 11 may include a display interface circuit 113 that is connected to the display device 12 via the video display interface 13, and is configured to prevent electrical leakage and/or to save power, details of which will be described later. The motherboard 11 may also include a system power generator 114 configured to provide power to the display interface circuit 113.

Figure 2:
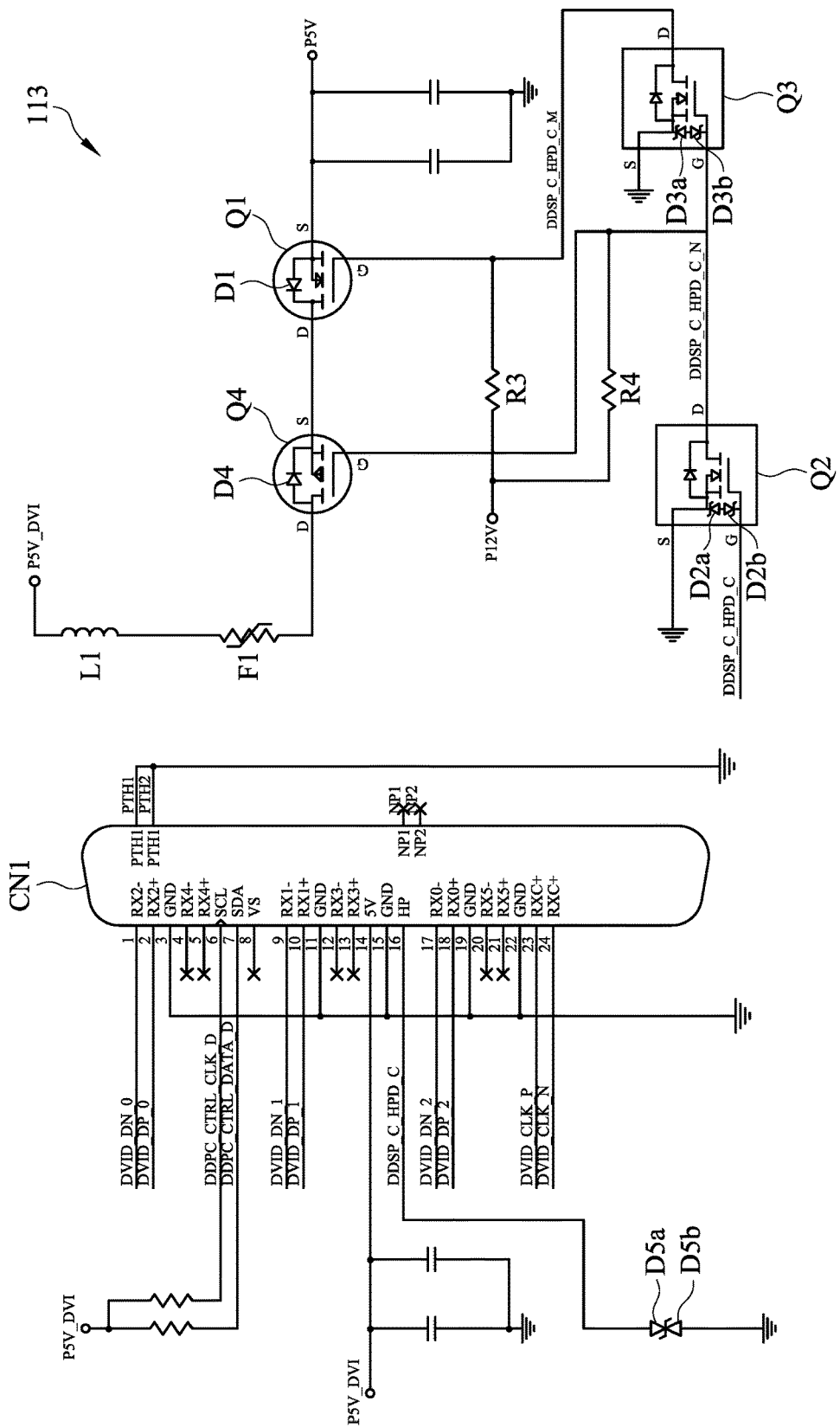
FIG. 2 shows a circuit diagram illustrating the display interface circuit of FIG. 1 according to one embodiment of the present invention.

FIG. 2 shows a circuit diagram illustrating the display interface circuit 113 of FIG. 1 according to one embodiment of the present invention. In the embodiment, the display interface circuit 113 may include a first metal-oxide-semiconductor transistor (first MOS transistor or first transistor hereinafter) Q4 and a second MOS transistor (second transistor hereinafter) that are electrically connected between a first motherboard power P5V (associated with the motherboard 11) and a display power P5V_DVI (associated with the display device 12). The first motherboard power P5V may be generated by the system power generator 114. As exemplified in FIG. 2, a source S of the first transistor Q4 is connected to a drain D of the second transistor Q1. It is appreciated that the connecting sequence of the first transistor Q4 and the second transistor Q1 is not limited to that as exemplified in FIG. 2. In the embodiment, the rated voltage of the first motherboard power P5V and the display power P5V_DVI is 5 volts. It is appreciated that the rated voltage of the first motherboard power and the display power may be different from 5 volts in a video display interface other than DVI. In addition to the first transistor Q4 and the second transistor Q1, further elements such as an inductor L1 and/or a fuse F1 may be connected between the first motherboard power P5V and the display power P5V_DVI. Specifically, the inductor L1 is configured to perform signal filtering, and the fuse F1 is configured to provide overcurrent protection.

In the embodiment, the first transistor Q4 may have a first-type (e.g., P type) channel, and have a first body diode D4 with a forward current direction (i.e., from the anode to the cathode) from the drain D to the source S. The second transistor Q1 may have a channel of a second-type (e.g., N type) which is opposite the first-type, and have a second body diode D1 with a forward current direction from the source S to the drain D. When the first transistor Q4 and the second transistor Q1 are electrically connected, the first body diode D4 has a current direction opposite the second body diode D1.

The display interface circuit 113 of the embodiment may include a first control circuit, which may include a third MOS transistor (third transistor hereinafter) Q2 with the second-type channel, and include a first resistor R4 connected between a drain D of the third transistor Q2 and a second motherboard power P12V. In the embodiment, the second motherboard power P12V may be generated by the system power generator 114. The rated voltage of the second motherboard power P12V may be, but not limited to, 12 volts. In another embodiment, the second motherboard power may be the same as the first motherboard power P5V.

The first control circuit Q2/R4 may be configured to generate a first control signal DDSP_C_HPD_C_N for controlling the first transistor Q4. For example, the first control signal DDSP_C_HPD_C_N is fed to a gate G of the first transistor Q4 to turn on or turn off the first transistor Q4. Specifically, a gate G of the third transistor Q2 operatively receives the hot plug signal DDSP_C_HPD_C (via a connector CN1 of digital visual interface (DVI)), a source S is connected to ground, and a drain D outputs the first control signal DDSP_C_HPD_C_N. Accordingly, when the display device 12 powers up, the hot plug signal DDSP_C_HPD_C (from the connector CN1 of DVI) becomes asserted (e.g., high voltage), thus turning on the third transistor Q2 and generating a low-voltage first control signal DDSP_C_HPD_C_N at the drain D to turn on the first transistor Q4.

An electrostatic discharge (ESD) protection circuit may be included at an input end (i.e., between the gate G and the source S) of the third transistor Q2. As exemplified in FIG. 2, the ESD protection circuit may include two Schottky diodes D2a and D2b that are inversely connected between the gate G and the source S of the third transistor Q2. As further exemplified in the connector CN1 of DVI in FIG. 2, two Schottky diodes D5a and D5b, configured to perform ESD protection, may be inversely connected between a pin associated with the hot plug signal DDSP_C_HPD_C and ground.

The display interface circuit 113 of the embodiment may include a second control circuit, which may include a fourth MOS transistor (fourth transistor hereinafter) Q3 with the second-type channel, and include a second resistor R3 connected between a drain D of the fourth transistor Q3 and the second motherboard power P12V. Further, an output end (e.g., the drain D of the third transistor Q2) of the first control circuit Q2/R4 is connected to an input end (e.g., a gate G of the fourth transistor Q3) of the second control circuit Q3/R3.

The second control circuit Q3/R3 may be configured to generate a second control signal DDSP_C_HPD_C_M for controlling the second transistor Q1. For example, the second control signal DDSP_C_HPD_C_M is fed to a gate G of the second transistor Q1 to turn on or turn off the second transistor Q1. Specifically, a gate G of the fourth transistor Q3 operatively receives the second motherboard power P12V via the first resistor R4, a source S is connected to ground, and a drain D outputs the second control signal DDSP_C_HPD_C_M. Accordingly, when the motherboard 11 powers up (but the display device 12 powers down), the second motherboard power P12V has a high voltage, thus turning on the fourth transistor Q3 and generating a low-voltage second control signal DDSP_C_HPD_C_M at the drain D to turn off the second transistor Q1.

An electrostatic discharge (ESD) protection circuit may be included at an input end (i.e., between the gate G and the source S) of the fourth transistor Q3. As exemplified in FIG. 2, the ESD protection circuit may include two Schottky diodes D3a and D3b that are inversely connected between the gate G and the source S of the fourth transistor Q3. Other pins and signals of the connector CN1 of DVI as shown in FIG. 2 are not directly pertinent to aspects of the embodiment and details of which are thus omitted for brevity.

Figure 3:
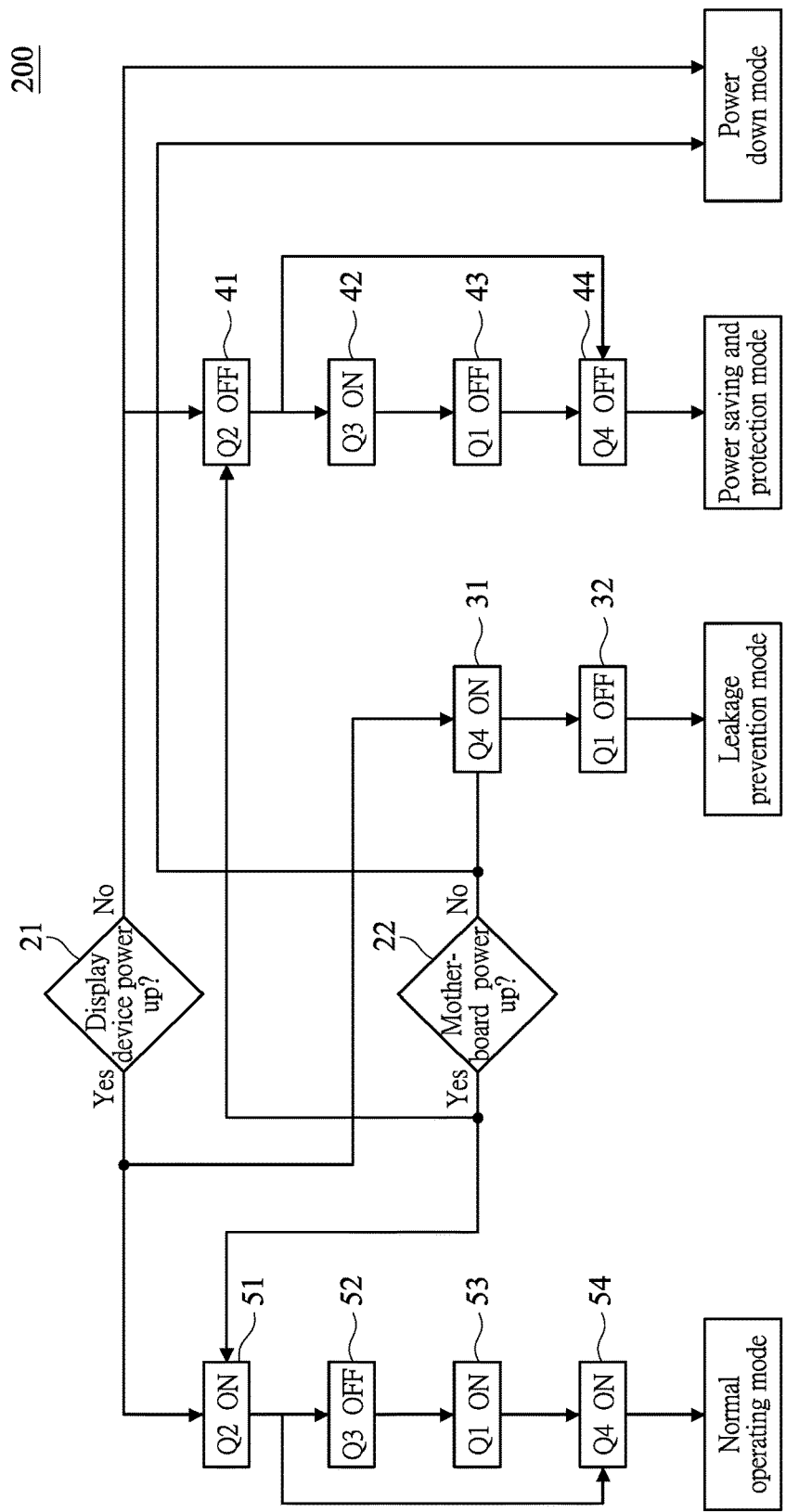
FIG. 3 shows a flow diagram illustrating a display interface method according to one embodiment of the present invention.

FIG. 3 shows a flow diagram illustrating a display interface method 200 according to one embodiment of the present invention. The display interface method 200 may include four operating modes, which will be described later in companion with the display interface circuit 113 of FIG. 2.

Steps 21-22 and 31-32 exemplify leakage prevention mode when the display device 12 powers up (left branch of step 21) but the motherboard 11 powers down (right branch of step 22). As the display device 12 powers up, the display power P5V_DVI has a high voltage, and the hot plug signal DDSP_C_HPD_C is asserted (e.g., high voltage); and as the motherboard 11 powers down, the first motherboard power P5V and the second motherboard power P12V possess no voltage. In step 31, the gate G of the third transistor Q2 operatively receives the asserted hot plug signal DDSP_C_HPD_C via the connector CN1 of DVI, according to which a low-voltage first control signal DDSP_C_HPD_C_N is generated and fed to the gate G of the first transistor Q4. As the first body diode D4 of the first transistor Q4 is turned on due to the high-voltage display power P5V_DVI, the first transistor Q4 is thus turned on. In step 32, the gate G of the fourth transistor Q3 operatively receives the low-voltage first control signal DDSP_C_HPD_C_N, which turns off the fourth transistor Q3 and therefore turns off the second transistor Q1. It is noted that, although the first body diode D4 of the first transistor Q4 is turned on due to the high-voltage display power P5V_DVI, the second body diode D1 of the second transistor Q1 can prevent leakage current flowing from the high-voltage display power P5V_DVI toward the first motherboard power P5V.

Steps 21-22 and 41-44 exemplify power saving and protection mode when the display device 12 powers down (or not connecting with a power or connecting with an abnormal power) (right branch of step 21) but the motherboard 11 powers up (left branch of step 22). As the display device 12 powers down, the display power P5V_DVI possesses no voltage, and the hot plug signal DDSP_C_HPD_C is de-asserted (e.g., low voltage); and as the motherboard 11 powers up, the first motherboard power P5V and the second motherboard power P12V have high voltage. In step 41, the gate G of the third transistor Q2 operatively receives the de-asserted hot plug signal DDSP_C_HPD_C via the connector CN1 of DVI, thus turning off the third transistor Q2. In step 42, the gate G of the fourth transistor Q3 operatively receives the high-voltage second motherboard power P12V via the first resistor R4, thus turning on the fourth transistor Q3 and generating a low-voltage second control signal DDSP_C_HPD_C_M. In step 43, the low-voltage second control signal DDSP_C_HPD_C_M turns off the second transistor Q1. In step 44, the gate G of the first transistor Q4 operatively receives the high-voltage second motherboard power P12V via the first resistor R4, thus turning off the first transistor Q4. It is noted that the first body diode D4 of the first transistor Q4 can prevent the high-voltage first motherboard power P5V from outputting to the connector CN1 of DVI, thus saving power. Moreover, the motherboard 11 can be protected if a short circuit happens externally or at the connector CN1.

Steps 21-22 and 51-54 exemplify normal operating mode when the display device 12 powers up (left branch of step 21) and the motherboard 11 powers up (left branch of step 22). As the display device 12 powers up, the display power P5V_DVI has a high voltage, and the hot plug signal DDSP_C_HPD_C is asserted (e.g., high voltage); and as the motherboard 11 powers up, the first motherboard power P5V and the second motherboard power P12V have high voltage. In step 51, the gate G of the third transistor Q2 operatively receives the asserted hot plug signal DDSP_C_HPD_C via the connector CN1 of DVI, thus turning on the third transistor Q2 and generating a low-voltage first control signal DDSP_C_HPD_C_N. In step 52, the gate G of the fourth transistor Q3 operatively receives the low-voltage first control signal DDSP_C_HPD_C_N, thus turning off the fourth transistor Q3. In step 53, the gate G of the second transistor Q1 operatively receives the high-voltage second motherboard power P12V via the second resistor R3, thus turning on the second transistor Q1. In step 54, the gate G of the first transistor Q4 operatively receives the low-voltage first control signal DDSP_C_HPD_C_N, thus turning on the first transistor Q4. Accordingly, the high-voltage first motherboard power P5V can be outputted to the node of the display power P5V_DVI via the turned-on second transistor Q1 and the turned-on first transistor Q4, and be further outputted to the display device 12 via the connector CN1 of DVI. It is noted that the resistance Rds(on) between the drain and the source of the turned-on first transistor Q4 and the turned-on second transistor Q1 is low enough such that a corresponding voltage drop is quite low. For example, suppose the resistances Rds(on) between the drain and the source of the turned-on first transistor Q4 and the turned-on second transistor Q1 are 31 milliohms and 115 milliohms respectively and the current of the display device 12 is 55 milliamperes, the total voltage drop of the first transistor Q4 and the second transistor Q1 is only 0.00803(=0.055*(0.031+0.115)) volt.

In power down mode when the display device 12 powers down (or not connecting with a power or connecting with an abnormal power) (right branch of step 21) and the motherboard 11 powers down (right branch of step 22), the display power P5V_DVI, the hot plug signal DDSP_C_HPD_C, the first motherboard power P5V and the second motherboard power P12V have low voltage. Accordingly, the first transistor Q4, the second transistor Q1, the third transistor Q2 and the fourth transistor Q3 are turned off and no current flows therein.

Although specific embodiments have been illustrated and described, it will be appreciated by those skilled in the art that various modifications may be made without departing from the scope of the present invention, which is intended to be limited solely by the appended claims.

What is claimed is:
1. A display interface circuit, comprising:
a first transistor having a first body diode;
a second transistor having a second body diode, the first transistor and the second transistor being electrically connected in series between a first motherboard power and a display power, and the first body diode having a current direction opposite the second body diode;
a first control circuit that controls the first transistor; and
a second control circuit that controls the second transistor;
wherein when a display device powers up but a motherboard powers down, the first control circuit turns on the first transistor and the second control circuit turns off the second transistor, such that a current does not leak from the display power toward the first motherboard power due to the second body diode;
wherein when the display device powers down but the motherboard powers up, the first control circuit turns off the first transistor and the second control circuit turns off the second transistor, such that the first motherboard power is not outputted to a video display interface due to the first body diode, thus saving power;
wherein the first control circuit comprises a third transistor that is controlled by a hot plug signal, and accordingly generates a first control signal that controls the first transistor; and
wherein the second control circuit comprises a fourth transistor that is controlled by the first control signal and a second motherboard power, and accordingly generates a second control signal that controls the second transistor.

2. The display interface circuit of claim 1, wherein the first transistor has a channel of first type and the second transistor has a channel of second type, and the first type is opposite the second type.

3. The display interface circuit of claim 2, wherein the first transistor has a P-type channel and the second transistor has an N-type channel, and a source of the first transistor is connected to a drain of the second transistor.

4. The display interface circuit of claim 1, wherein the video display interface comprises digital visual interface.

5. The display interface circuit of claim 1, further comprising:
an inductor electrically connected in series to the first transistor and the second transistor; and
a fuse electrically connected in series to the first transistor and the second transistor.

6. The display interface circuit of claim 1, wherein the first control circuit comprises:
the third transistor having a gate coupled to receive the hot plug signal from the video display interface, a source connected to ground, and a drain generating the first control signal to control the first transistor; and a first resistor connected between the drain of the third transistor and the second motherboard power.

7. The display interface circuit of claim 6, further comprising two Schottky diodes that are inversely connected between the gate and the source of the third transistor.

8. The display interface circuit of claim 6, further comprising two Schottky diodes that are inversely connected between a pin associated with the hot plug signal and ground.

9. The display interface circuit of claim 1, wherein the second control circuit comprises:

the fourth transistor having a gate coupled to receive an output of the first control circuit, a source connected to ground, and a drain generating the second control signal to control the second transistor; and a second resistor connected between the drain of the fourth transistor and the second motherboard power.

10. The display interface circuit of claim 9, further comprising two Schottky diodes that are inversely connected between the gate and the source of the fourth transistor.

11. A display interface method, comprising:

electrically connecting a first transistor and a second transistor in series between a first motherboard power and a display power, the first transistor having a first body diode with a current direction opposite a second body diode of the second transistor;

providing a first control circuit that controls the first transistor; and providing a second control circuit that controls the second transistor;

wherein when a display device powers up but a motherboard powers down, the first control circuit turns on the first transistor and the second control circuit turns off the second transistor such that a current does not leak from the display power toward the first motherboard power due to the second body diode;

wherein when the display device powers down but the motherboard powers up, the first control circuit turns off the first transistor and the second control circuit turns off the second transistor such that the first motherboard power is not outputted to a video display interface due to the first body diode, thus saving power;

wherein the first control circuit comprises a third transistor that is controlled by a hot plug signal, and accordingly generates a first control signal that controls the first transistor; and wherein the second control circuit comprises a fourth transistor that is controlled by the first control signal and a second motherboard power, and accordingly generates a second control signal that controls the second transistor.

12. The display interface method of claim 1, wherein the first transistor has a channel of first type and the second transistor has a channel of second type, and the first type is opposite the second type.

13. The display interface method of claim 12, wherein the first transistor has a P-type channel and the second transistor has an N-type channel, and a source of the first transistor is connected to a drain of the second transistor.

14. The display interface method of claim 11, wherein the video display interface comprises digital visual interface.

15. A computer system, comprising:

a video display interface;

a display device;

a motherboard providing video signals to the display device via the video display interface; and a system power generator providing a first motherboard power;

wherein the motherboard comprises a display interface circuit that comprises:

a first transistor having a first body diode;

a second transistor having a second body diode, the first transistor and the second transistor being electrically connected in series between the first motherboard power and a display power, and the first body diode having a current direction opposite the second body diode;

a first control circuit that controls the first transistor; and a second control circuit that controls the second transistor;

wherein when the display device powers up but the motherboard powers down, the first control circuit turns on the first transistor and the second control circuit turns off the second transistor such that a current does not leak from the display power toward the first motherboard power due to the second body diode;

wherein when the display device powers down but the motherboard powers up, the first control circuit turns off the first transistor and the second control circuit turns off the second transistor such that the first motherboard power is not outputted to the video display interface due to the first body diode, thus saving power;

wherein the first control circuit comprises a third transistor that is controlled by a hot plug signal, and accordingly generates a first control signal that controls the first transistor; and wherein the second control circuit comprises a fourth transistor that is controlled by the first control signal and a second motherboard power, and accordingly generates a second control signal that controls the second transistor.

16. The computer system of claim 15, wherein the first transistor has a channel of first type and the second transistor has a channel of second type, and the first type is opposite the second type.

17. The computer system of claim 16, wherein the first transistor has a P-type channel and the second transistor has an N-type channel, and a source of the first transistor is connected to a drain of the second transistor.

18. The computer system of claim 15, wherein the video display interface comprises digital visual interface.

19. The computer system of claim 15, wherein the first control circuit comprises:

the third transistor having a gate coupled to receive the hot plug signal from the video display interface, a source connected to ground, and a drain generating the first control signal to control the first transistor; and a first resistor connected between the drain of the third transistor and the second motherboard power.

20. The computer system of claim 15, wherein the second control circuit comprises:

the fourth transistor having a gate coupled to receive an output of the first control circuit, a source connected to ground, and a drain generating the second control signal to control the second transistor; and a second resistor connected between the drain of the fourth transistor and the second motherboard power.

\* \* \* \* \*